United States Patent
Repetto

[11] 3,879,967
[45] Apr. 29, 1975

[54] INSTALLATION FOR THE DE-FLESHING OF SKINS

[75] Inventor: Silvio Repetto, Modena, Italy

[73] Assignee: S.p.A. Luigi Rizzi & C., Modena, Italy

[22] Filed: July 27, 1973

[21] Appl. No.: 383,143

[30] Foreign Application Priority Data
July 28, 1972  Italy.................... 27590/72

[52] U.S. Cl. .................................. 69/42
[51] Int. Cl. ............................... C14b 1/06
[58] Field of Search ........................... 69/42

[56] References Cited
UNITED STATES PATENTS

| | | | |
|---|---|---|---|
| 1,562,418 | 11/1925 | Tenney | 69/42 |
| 3,116,627 | 1/1964 | Mani et al. | 69/42 |
| 3,552,157 | 1/1971 | Repetto | 69/42 |
| 3,636,737 | 1/1972 | Schwaller et al. | 69/42 |

FOREIGN PATENTS OR APPLICATIONS
626,637  10/1961  Italy.................... 69/42

Primary Examiner—Alfred R. Guest
Attorney, Agent, or Firm—Kurt Kelman

[57] ABSTRACT

Two defleshing machines of the type disclosed in U.S. Pat. No. 3,552,157 are modified so that they receive skins to be defleshed through respective feed openings directed in opposite horizontal directions, and discharge the defleshed or partly defleshed skins downwardly. A transfer conveyor receives the skins discharged from the first machine and raises them to the feed opening of the second machine. If the feed openings are directed toward each other, the skins are discharged from the second machine to an off-loading conveyor with their hair sides up. If the feed openings are directed horizontally away from each other, the fully defleshed skins are discharged to the off-loading conveyor with their flesh sides up.

6 Claims, 2 Drawing Figures

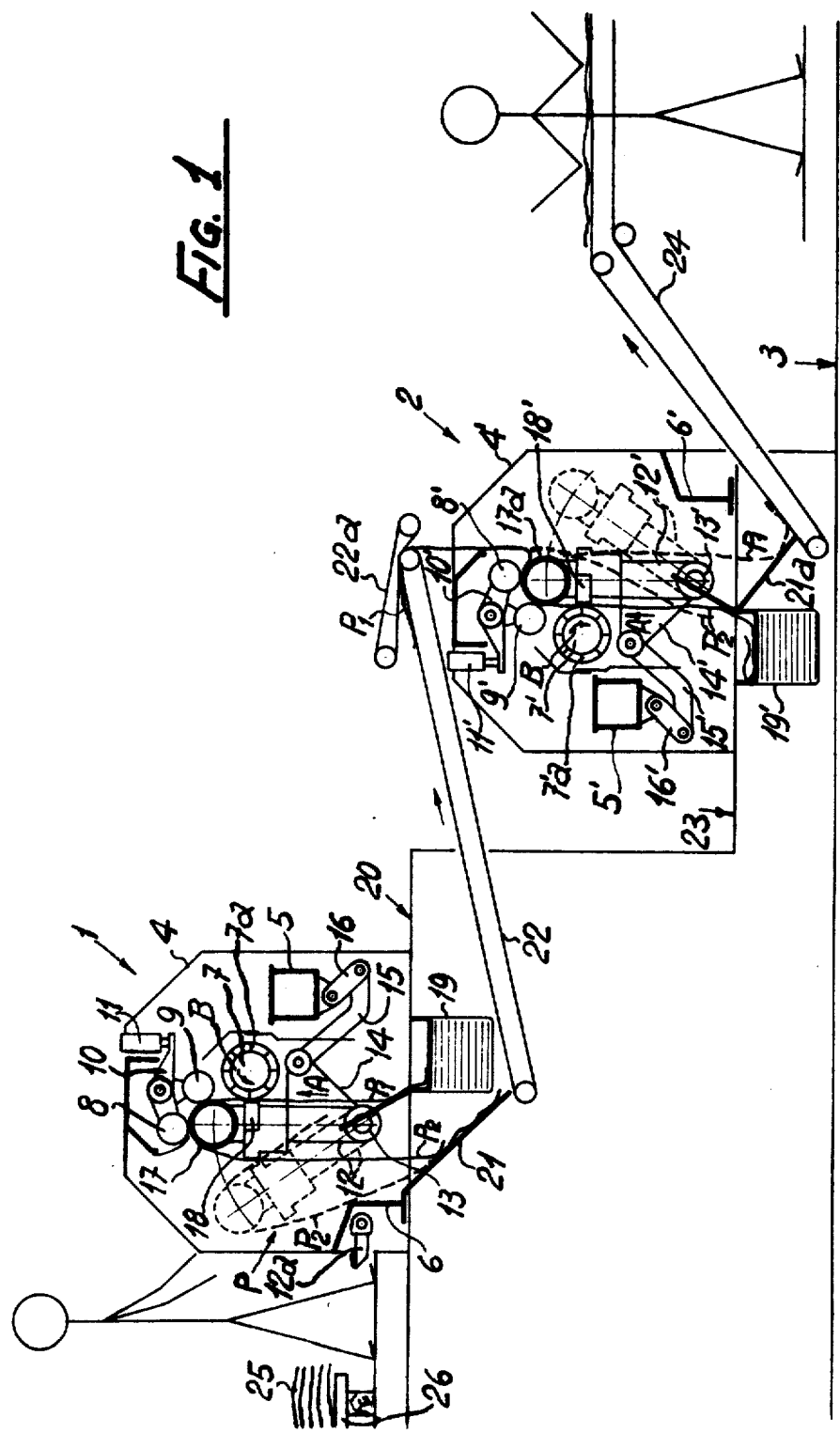

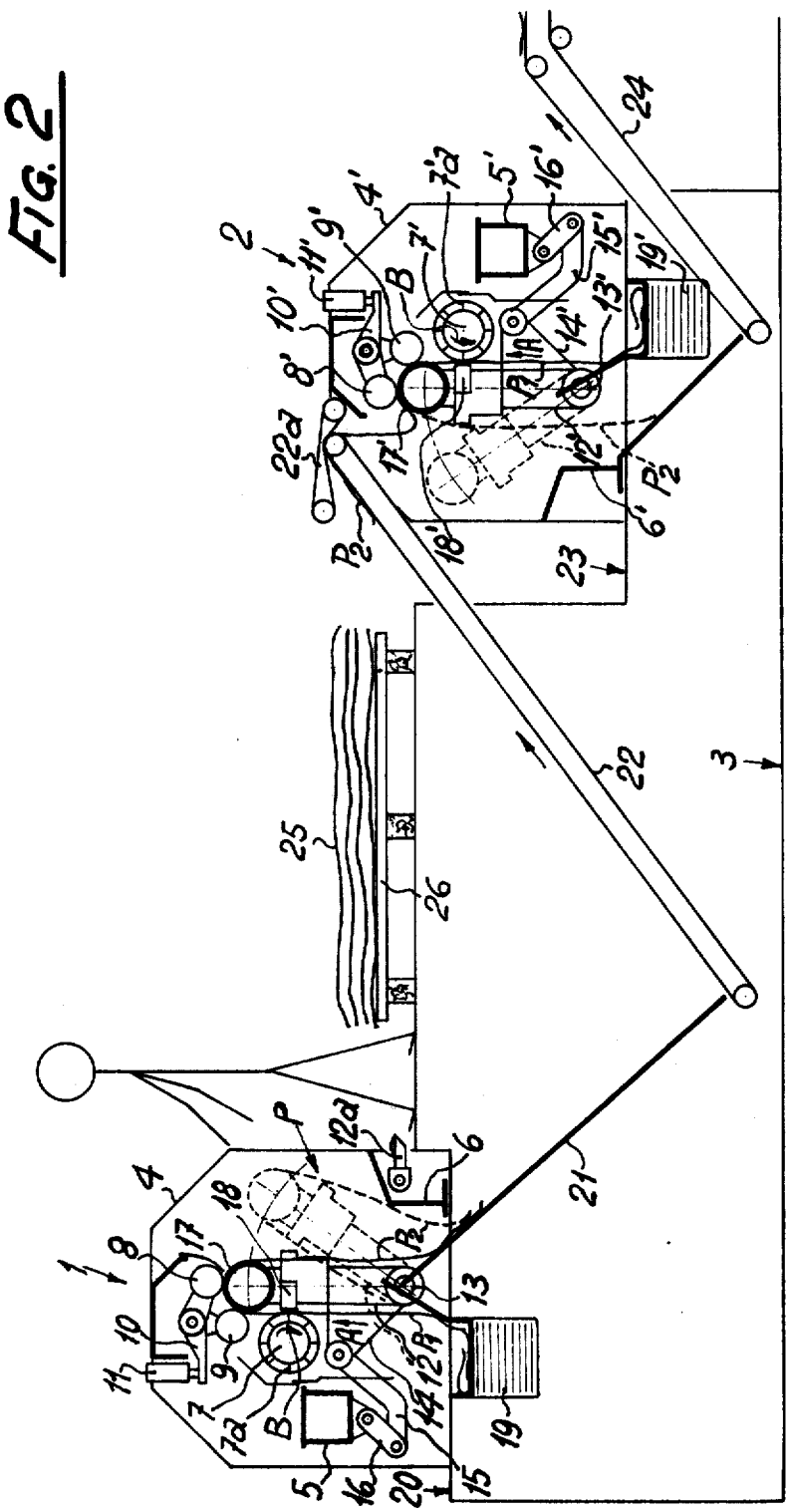

INSTALLATION FOR THE DE-FLESHING OF SKINS

The present invention relates to an installation for the continuous de-fleshing of skins or hides in which a first portion of the skin to be processed is introduced into a first de-fleshing machine which processes the first portion, the skin then being deposited onto a conveyor belt which feeds the remaining portion of the skin into a second de-fleshing machine which processes the remaining part of the skin.

The operation of de-fleshing of skin or hide is effected whilst the skin is still fresh after flaying or after an initial tanning. The skin is, at the time of processing, very damp and has compacted matter such as clots of blood, flesh or fat still adhering thereto.

The de-fleshing of a skin or hide consists in shaving or cutting of clots of blood or projections of fat. This is normally effected using rotating blades, but it is necessary to keep the skin/or hide under tension whilst it is passed in front of a series of blades or knives which are usually mounted on a rotating roller. To do this, it is necessary for the skin to be processed from its center towards its ends. This is because the ends of the skin correspond to the head, paws and tail of the animal and it would be impossible to start the processing from these regions. Thus, approximately one half of the skin is introduced into a de-fleshing machine and is located between a pair of driving rollers. These rollers advance the skin or hide and subject it to the cutting action of a series of blades mounted on a roller rotating in the opposite dierction to the direction of advance of the skin. Upon the introduction of the first half of the skin between the rollers, an operator is obliged, in order for continuous processing to be achieved, to turn over the half of the skin which is not passed between the driving rollers and locate it on a conveyor belt so as to cause it to advance towards a second de-fleshing machine. This must be effected as soon as processing of the first half of the skin is commenced.

If it is taken into consideration that a normal skin may be 2 or 3 metres in length and is relatively heavy, it will be understood that the turning over of half the skin, imbued, as previously stated, with fatty substances and being both slippery and repellent, requires considerable use of manpower and time. Furthermore, known continuous de-fleshing installations cause the skin to emerge with its flesh side uppermost. If it is therefore desired to inspect the outer surface of the skin, the skin must again be turned over manually utilising further manpower and consequential loss of time.

It is an object of the present invention to substantially eliminate these disadvantages and to provide an installation which permits continuous processing of skins without the necessity of manually turning over half of the skin, thereby requiring less manpower than has hiterto been the case. It is a subsidiary object of the invention to provide an installation which causes the skin to emerge from the processing operation with its outer or hair-side uppermost such that inspection is facilitated.

According to the present invention, there is therefore provided an installation for the continuous de-fleshing of skins comprising two de-fleshing machines spaced apart from one another disposed so that one is a mirror image of the other, a transfer conveyor being located such that its rearward end is below the first machine and its forward end is located above the second machine and an off-loading conveyor which is located such that its rearward end is below the second machine and is inclined upwardly, and a slide or conveyor associated with each machine for receiving and conveying the skin downwardly, during and after the de-fleshing process performed thereon, onto the rearward end of the conveyor located therebelow.

Preferably, the first de-fleshing machine is located on a level higher than that of the second de-fleshing machine which in turn is located above ground level such that the rearward end of the off-loading conveyor is located below the slide or conveyor for collecting the processed skin.

Advantageously, each de-fleshing machine comprises a mechanism displaceable between an opening and an operating position, the machines being so arranged that if the displacement of each mechanism into its opening position is effected in a direction away from the vertical center axis, the skin is off-loaded with its flesh-side uppermost and if the displacement into its opening position is effected in a direction towards the vertical centre axis, the skin is off-loaded with its hair-side uppermost.

Further preferably, the skin is off-loaded with its hair-side uppermost, a store of skins to be treated being located intermediate the two de-fleshing machines.

Further advantageously, the two de-fleshing machines are located at ground level, the rearward end of the transfer conveyor and the off-loading conveyor being located below ground level.

Utilising the installation of the present invention, it is therefore possible for a single operator to de-flesh a skin or hide. It is merely necessary to feed one half of the skin into the first de-fleshing machine until it is gripped by the driving roller. The other half of the skin may be left hanging downwardly. One half of the skin is therefore processed in the first de-fleshing machine, the skin being processed from its centre towards one of its ends. The whole skin then drops onto the slide or conveyor below the first machine, the unprocessed half being forward of the processed half. The skin is then transferred into the transfer conveyor and is introduced into the second machine which is disposed with its driving roller in its open position. The skin therefore drops off the conveyor into the second machine in the correct position for processing the second half. The first or processed half of the skin is not gripped by the driving roller and passes onto the slide or conveyor end, hence, onto the off-loading conveyor belt. The position of the skin may, as stated, be with its flesh side or its hair-side uppermost according to inspection or subsequent processing requirements.

The invention will be further described, purely by way of example, with reference to the accompanying drawings, in which:

FIG. 1 is a diagrammatic view of an installation in accordance with the present invention which causes the skin to emerge with its flesh side uppermost and FIG. 2 shows an installation similar to that shown in FIG. 1, but arranged so that the skin emerges with its outer or hair-side uppermost.

As shown in FIG. 1, an installation comprises a first defleshing macine 1 and a second de-fleshing machine 2 which are disposed at different levels relatively to the ground 3. In this embodiment the machine 1 is at a level higher than the machine 2 which, in turn, is at a higher level than the ground 3. The two machines 1 and 2 are identical and like parts are given the same reference numerals, the parts of machine 2 being distinguished from the parts of machine 1 by the addition of a prime to the reference numerals. Each machine comprises a pair of end frames 4 connected together by a rigid cross bar 5, which forms part of the base 6 of the machine. Mounted between end frames 4 is a cutting or defleshing roller 7 having blades 7a, means (not shown) being provided for controlling the rotation of the roller. A pair of feed rolls 8, 9, the positions of which may be adjusted by means of levers 10 and thrust means 11 of known type are also mounted between end frames 4. Also mounted between the end frames is a displaceable mechanism 12 which can be pivoted about a shaft 13 and is controlled through an extension member 14 by connecting links 15 and 16 in a known manner. The mechanism 12 has two stable positions, one being in its operational position indicated in the drawings in full lines and one being its opening position shown in broken lines. The displaceable mechanism 12 is provided, in its upper portion, with a driving roller 17 and a pressure slide 18 each adapted in known manner to drive from the bottom upwardly a skin to be processed and to press the skin itself against the blades 7a of the cutting roller 7.

The skin is pressed against the roller 7 and subjected to the cutting action of the blades 7a by co-operation between the roller 17 and feed rolls 8 and 9. As shown in broken lines, when the machine is in its open position, the displaceable mechanism 12 is rotated about the axis 13 and inclined outwardly thereby removing both the roller 17 and the slide 18 from engagement with the respective rollers 8 and 9 and from the cutting roller 7 to enlarge the feed opening between the rollers 8, 7, the feed opening being directed horizontally away from that of the machine 2. This movement of the mechanism 12 is controlled by pedal 12a.

The skin to be processed may then be introduced into the intermediate space. Below the space, a collecting gutter 19 is provided for liquids and parts severed from the skin.

As can be seen in FIG. 1, the machine 1 is located at a first level on a support 20. Below the support 20 is located a slide or conveyor 21 having a downwardly inclined surface which terminates above the rearward end of a conveyor belt 22 which is inclined upwardly and terminates above the second machine 2 which is located on a support 23. The support 23 is located above ground level 34 but below the level of support 20 of the machine 1.

This second machine also has a downwardly inclined slide or conveyor 21a, which terminates above the rearward end of a conveyo belt 24 inclined upwardly and terminating at an off-loading station. At the level of the support 20 upon which the first machine is located, a stock of skins 25 is provided on a support 26 at the disposal of the operator.

The operation of the installation will now be described. An operator, shown schematically in FIG. 1, operates the pedal 12a, so as to move the displaceable mechanism 12 into its open position as shown in broken lines. A skin P is then taken from the stock 25 and placed over the roller 17, in such a manner that it is divided into two substantially equal portions or sides $P_1$ and $P_2$. When the displaceable mechanism 12 is moved into its operating position the feed opening is restricted and, the side $P_1$ of the skin P is driven upwardly (in the direction of arrows A) by cooperating feed rolls 8, 9 and 17, the cutting roller 7 meanwhile rotating in the direction of arrow B, that is to say, in a direction opposed to the direction of travel of the skin at the point of contact of the roller and the skin The slide 18 maintains a uniform thickness of skin in the operating zone.

The side $P_2$ of the skin is not treated by the cutting roller 7 and as the side $P_1$, is progressively treated, the side $P_2$ progressively drops onto slide or conveyor 21. From slide or conveyor 21, side $P_2$ is transferred to conveyor belt 22 until, when the processing of side $P_1$ is finished, the skin passes entirely onto this belt and arrives at the second machine 2. This machine is preset so that its displaceable mechanism 12' is in its open position. The side $P_2$ which has not, as yet, been processed, therefore becomes disposed as indicated in broken lines.

When the part $P_2$ of the skin has entered the machine 2, the displaceable mechanism 12' is moved into its operative position and the processing of side $P_2$ is effected in a manner identical to that described for side $P_1$ in machine 1.

Meanwhile the already processed side $P_1$ of the skin, drops from the conveyor belt 22 into the machine 2, onto the slide or conveyor 21a and thence is discharged onto the outgoing conveyor 24. Upon termination of the processing of the second side $P_2$ the entire skin moves onto the conveyor 24 with the flesh side upwardly and may, for example, be inspected by a further operator.

With reference to FIG. 2, the de-fleshing machines 1 and 2, conveyor members 22 to 24, stock of skins 25 and support 26 are identical to those shown in FIG. 1. However, the arrangement of the parts is changed in order to cause the processed skin, driven by the conveyor 24, to emerge with the outside or hair-side facing upwardly, that is to say, reversed relative to the embodiment shown in FIG. 1.

In this case, the de-fleshing machines 1 and 2 are again symmetrically located about a vertical reference line, but are spaced further apart than shown in FIG. 1. Moreover, the feed openings bounded by the displaceable mechanisms 12 and 12' are open towards each other instead of outwardly. The support 26 for the stock of skins 25 is located between the two machines and raised on the support 20. The conveyor belt 22 is longer than that shown in the arrangement of FIG. 1.

The operation of the installation is identical with that described with reference to FIG. 1 and like reference numerals are used for like parts.

Both Figures show, at the forward end of the conveyor 22, a moving belt 22a which acts as a retaining element for the skin when the second side of the skin is about to drop into the machine 2, so that the feeding takes place gradually without unwanted sliding movements.

In the arrangement shown in FIG. 2, the skin travelling up conveyor 24 is off-loaded with its hair-side turned upwardly so that an observer, shown schematically in FIG. 1, may inspect it.

According to a variant of the present invention, the two machines 1, 2 may both be located on the same level, which may be the level of the ground 3 or may be raised relative thereto. In both cases it is sufficient merely to vary the length and slope of the two conveyors 22 and 24 and to ensure that sufficient space is left so that the end of the slides or conveyors 21, 21a of the machines may terminate above the beginning of the conveyor 22 or 24 respectively.

What we claim is:

1. In an installation for the continuous de-fleshing of skins, including two horizontally spaced de-fleshing machines arranged so that a first one of the machines is a mirror image of a second one of the machines relative to a vertical reference line intermediate the machines, each machine comprising a de-fleshing means and feed means for feeding a trailing first portion of a skin upwardly past the de-fleshing means for de-fleshing the first portion while simultaneously downwardly discharging a leading second portion of the skin from the machine, and transfer conveyor means for conveying the skin from the first to the second machine, the improvement of the transfer conveyor means consisting essentially of a single, stationarily mounted, unidirectionally moving conveyor having a rear end and a forward end, a stationarily mounted conveying means mounted on each machine for receiving and conveying the leading second portion of the skin from the machine, a first one of the conveying means being mounted below the first machine to convey the leading second portion of the skin from the first machine to the rear end of the unidirectionally moving conveyor, the rear conveyor end being mounted below the first machine and the forward end of the conveyor being mounted above the second machine, an upwardly inclined discharge conveyor having a rear end below the second machine, and a second one of the conveying means being mounted below the second machine to convey the leading second portion of the skin from the second machine to the rear end of the discharge conveyor.

2. In the installation of claim 1, the first machine being located on a level higher than that of the second machine.

3. In the installation of claim 1, a stationary store of the skins disposed intermediate the two machines.

4. In the installation of claim 1, the feed means comprising feed rolls cooperating with a skin support roller, the skin support roller being displaceable in respect of the feed rolls between an inoperative and an operating position, the skin support roller of the feed means of each machine being displaceable away from the reference line.

5. In the installation of claim 1, the feed means comprising feed rolls cooperating with a skin support roller, the skin support roller being displaceable in respect of the feed rolls between an inoperative and and operating position, the skin support roller of the feed means of each machine being displaceable towards the reference line.

6. In the installation of claim 1, the conveying means being a slide.

* * * * *